United States Patent
Ichikawa et al.

(10) Patent No.: US 7,888,811 B2
(45) Date of Patent: Feb. 15, 2011

(54) POWER SUPPLY SYSTEM, VEHICLE WITH THE SAME, TEMPERATURE RISE CONTROL METHOD OF POWER STORAGE DEVICE AND COMPUTER-READABLE RECORDING MEDIUM BEARING PROGRAM FOR EXECUTING COMPUTER TO PERFORM TEMPERATURE RISE CONTROL OF POWER SUPPLY DEVICE

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 163 days.

(21) Appl. No.: 12/308,683

(22) PCT Filed: Jun. 14, 2007

(86) PCT No.: PCT/JP2007/062475

§ 371 (c)(1),
(2), (4) Date: Dec. 22, 2008

(87) PCT Pub. No.: WO2008/013011

PCT Pub. Date: Jan. 31, 2008

(65) Prior Publication Data
US 2009/0315396 A1 Dec. 24, 2009

(30) Foreign Application Priority Data
Jul. 25, 2006 (JP) .............................. 2006-202028

(51) Int. Cl.
*B60L 1/00* (2006.01)
(52) U.S. Cl. ...................................................... 307/9.1
(58) Field of Classification Search .................. 307/9.1
See application file for complete search history.

(56) References Cited

U.S. PATENT DOCUMENTS 7,402,982 B2 * 7/2008 Ito et al. ..................... 320/150

FOREIGN PATENT DOCUMENTS

| JP | A-2003-274565 | 9/2003 |
|----|---------------|--------|
| JP | A-2004-056937 | 2/2004 |
| JP | A-2005-332777 | 12/2005 |
| JP | A-2006-067668 | 3/2006 |
| JP | A-2006-121874 | 5/2006 |
| JP | A-2006-158173 | 6/2006 |

OTHER PUBLICATIONS

U.S. Appl. No. 12/309,643, filed Jun. 2007, Shinji Ichikawa et al.*

* cited by examiner

*Primary Examiner*—Robert L. Deberadinis
(74) *Attorney, Agent, or Firm*—Oliff & Berridge, PLC

(57) ABSTRACT

A converter ECU controls a converter to transmit an electric power between a power storage device and a power storage unit through a main positive bus line and a main negative bus line during temperature rise control of the power storage device. Specifically, converter ECU sets a target voltage of the converter to a second voltage value lower than a first voltage value when a voltage value reaches the first voltage value, and sets the target voltage of the converter to the first voltage value when the voltage value reaches the second voltage value.

15 Claims, 10 Drawing Sheets

WHEN POWER STORAGE DEVICE IS EXTREMELY LOW IN TEMPERATURE OR LOW IN SOC

WHEN POWER STORAGE DEVICE IS EXTREMELY LOW IN TEMPERATURE OR LOW IN SOC

POWER SUPPLY SYSTEM, VEHICLE WITH THE SAME, TEMPERATURE RISE CONTROL METHOD OF POWER STORAGE DEVICE AND COMPUTER-READABLE RECORDING MEDIUM BEARING PROGRAM FOR EXECUTING COMPUTER TO PERFORM TEMPERATURE RISE CONTROL OF POWER SUPPLY DEVICE

TECHNICAL FIELD

The invention relates to a control technique for raising a temperature of a power storage device included in a power supply system.

BACKGROUND ART

In recent years, attention has been given to hybrid vehicles and electric vehicles against the background of environmental issues. These vehicles is equipped with an electric motor as a drive power source, and is also equipped with a power storage device such as a secondary battery or a capacitor as an electric power supply thereof.

Generally, in the power storage device such as a secondary battery or a capacitor, when a temperature lowers, a capacitance lowers and thereby charge/discharge characteristics thereof lower. In the above kinds of vehicles, a temperature of the power storage device must be rapidly raised when the temperature of the power storage device is low after a vehicle system started.

Japanese Patent Laying-Open No. 2005-332777 has disclosed a warm-up control device that controls charge/discharge of a cold battery to warm up it by internal heat generation of the battery. This warm-up control device includes charge/discharge pattern setting means, limit value setting means and warm-up control means. Based on a battery state, charge/discharge pattern setting means variably sets a charge/discharge pattern in which the charging and discharging of the battery are alternately repeated in a pulse-like form. According to the battery temperature, the limit value setting means variably sets a limit value which limits a maximum amplitude of the charge/discharge pattern. According to the charge/discharge pattern that is set by the charge/discharge pattern setting means, the warm-up control means executes the charging and discharging of the battery without exceeding a range of the limit value set by the limit value setting means, when the battery temperature is lower than a defined temperature.

The above warm-up control device can efficiently control the charge/discharge according to the state of the battery when it is cold, and thereby can promote the temperature rise by the internal heat generation and quickly recover the battery capacity lowered when it is cold.

However, Japanese Patent Laying-Open No. 2005-332777 has not disclosed temperature rise control in a power supply system including a converter that is arranged between a battery and an inverter for voltage conversion between the battery and the inverter as well as and a power storage unit (e.g., a capacitor) connected, in parallel with the converter, to the inverter.

DISCLOSURE OF THE INVENTION

Accordingly, an object of the invention is to provide a power supply system capable of raising a temperature of a power supply device, using a converter that can convert a voltage between the power storage device and a load device as well as a power storage unit connected, in parallel with the converter, to the load device, and is also to provide a vehicle with the power supply system.

Another object of the invention is to provide a temperature rise control method for raising a temperature of a power storage device, using a converter that can convert a voltage between the power storage device and a load device as well as a power storage unit that is connected, in parallel with the converter, to the load device.

Still another object of the invention is to provide a computer-readable recording medium bearing a program for causing a computer to execute temperature rise control for raising a temperature of a power storage device, using a converter that can convert a voltage between the power storage device and a load device as well as a power storage unit that is connected, in parallel with the converter, to the load device.

According to the invention, a power supply system is capable of supplying an electric power to a load device, and includes a chargeable and dischargeable power storage device, a power line, a converter, a power storage unit, a control device and a voltage sensor. The power line is configured to be capable of supplying and receiving the electric power between the power supply system and the load device. The converter is arranged between the power storage device and the power line for performing voltage conversion between the power storage device and the power line. The power storage unit is chargeable and dischargeable, and is connected to the power line. The control device controls the converter by setting a predetermined target value. The voltage sensor senses a voltage on the power line. During temperature rise control for raising a temperature of at least one of the power storage device and the power storage unit, the control device sets the target value such that the converter passes the electric power from the power storage device through the power line to the power storage unit when the voltage sensed by the voltage sensor reaches a lower limit value, and sets the target value such that the converter passes the electric power from the power storage unit through the power line to the power storage device when the sensed voltage reaches an upper limit value.

Preferably, the upper and lower limit values are set according to a state of the power storage device.

Further preferably, the upper and lower limit values are set to larger values as the temperature of the power storage device lowers.

Further preferably, the upper and lower limit values are set to larger values as a state quantity representing a state of charge of the power storage device decreases.

Preferably, the upper and lower limit values are set to values being close to and not exceeding the voltage upper limit value of the power line.

Further predetermined, the upper and lower limit values are set to values being close to and not lower than a voltage of the power storage device when the temperature of the power storage unit is to be raised preferentially.

Preferably, the control device controls the converter such that the voltage on the power line attains a target voltage. The control device sets the target voltage to a first voltage value higher than the lower limit value when the sensed voltage reaches the lower limit value during the temperature rise control, and sets the target voltage to a second voltage value lower than the upper limit value when the sensed voltage reaches the upper limit value during the temperature rise control.

Further preferably, the first voltage value is the upper limit value, and the second voltage value is the lower limit value.

Preferably, the control device controls the converter such that a charge/discharge current of the power storage device attains a target current. The control device sets the target current to a first current value such that the power storage device discharges when the sensed voltage reaches the lower limit value during the temperature rise control, and sets the target current to a second current value such that the power storage device is charged when the sensed voltage reaches the upper limit value during the temperature rise control.

Further preferably, the second current value is equal to a value obtained by inverting a sign of the first current value.

Preferably, the power storage device includes a secondary battery, and the power storage unit includes a capacitor.

Preferably, the power storage unit is a smoothing capacitor reducing an electric power variation component of the power line.

Also, according to the invention, a vehicle includes one of the foregoing power supply systems as well as a drive power generating unit generating a drive power of the vehicle by receiving the electric power supplied from the power supply system.

Further, the invention provides a temperature rise control method of a power storage device in a power supply system capable of supplying an electric power to a load device. The power supply system includes the chargeable and dischargeable power storage device, a power line, a converter, a power storage unit and a voltage sensor. The power line is configured to be capable of transmitting the electric power between the power supply system and the load device. The converter is arranged between the power storage device and the power line for performing voltage conversion between the power storage device and the power line. The power storage unit is chargeable and dischargeable, and is connected to the power line. The voltage sensor senses a voltage on the power line. The temperature rise control method includes a first step of controlling the converter by setting a predetermined target value; a second step of determining whether the voltage sensed by the voltage sensor reached a lower limit value or not; a third step of setting the target value such that the converter passes the electric power from the power storage device through the power line to the power storage unit, when it is determined that the sensed voltage reached the lower limit value; a fourth step of determining whether the sensed voltage reached an upper limit value or not; and a fifth step of setting the target value such that the converter passes the electric power from the power storage unit through the power line to the power storage device, when it is determined that the sensed voltage reached the upper limit value.

Further, the invention provides a computer-readable recording medium bearing a program for causing a computer to execute temperature rise control of a power storage device in a power supply system capable of supplying an electric power to a load device. The power supply system includes the chargeable and dischargeable power storage device, a power line, a converter, a power storage unit and a voltage sensor. The power line is configured to be capable of transmitting the electric power between the power supply system and the load device. The converter is arranged between the power storage device and the power line for performing voltage conversion between the power storage device and the power line. The power storage unit is chargeable and dischargeable, and is connected to the power line. The voltage sensor senses a voltage on the power line. The recording medium bears the program for causing the computer to execute a first step of controlling the converter by setting a predetermined target value; a second step of determining whether the voltage sensed by the voltage sensor reached a lower limit value or not; a third step of setting the target value such that the converter passes the electric power from the power storage device through the power line to the power storage unit, when it is determined that the sensed voltage reached the lower limit value; a fourth step of determining whether the sensed voltage reached an upper limit value or not; and a fifth step of setting the target value such that the converter passes the electric power from the power storage unit through the power line to the power storage device, when it is determined that the sensed voltage reached the upper limit value.

According to the invention, the converter is arranged between the power storage device and the power line, and the power storage unit is connected to the power line. During temperature rise control for raising the temperature of at least one of the power storage device and the power storage unit, the control device sets the target value of the converter such that the converter passes the electric power from the power storage device through the power line to the power storage unit when the voltage sensed by the voltage sensor reaches the lower limit value, and sets the target value of the converter such that the converter passes the electric power from the power storage unit through the power line to the power storage device when the voltage sensed by the voltage sensor reaches an upper limit value. Therefore, the electric power can be transmitted between the power storage device and power storage unit without transmitting the electric power between power supply system and the load device while controlling the voltage on the power line to stay between the upper and lower limit values.

According to the invention, therefore, the temperature of the power storage device can be raised before the power supply system starts the supply/reception of the electric power to/from the load device. Consequently, the charge/discharge characteristics of the power storage device can be sufficiently ensured at and after the start of run of the vehicle even when the temperature is low.

Further, the invention can prevent the power line from bearing an over-voltage. Consequently, the various devices and units connected to the power lines can be protected from over-voltage breakdown.

BEST MODES FOR CARRYING OUT THE INVENTION

Embodiments of the invention will now be described with reference to the drawings. In the following description, the same or corresponding portions bear the same reference numbers, and description thereof is not repeated.

First Embodiment

Figure 1:
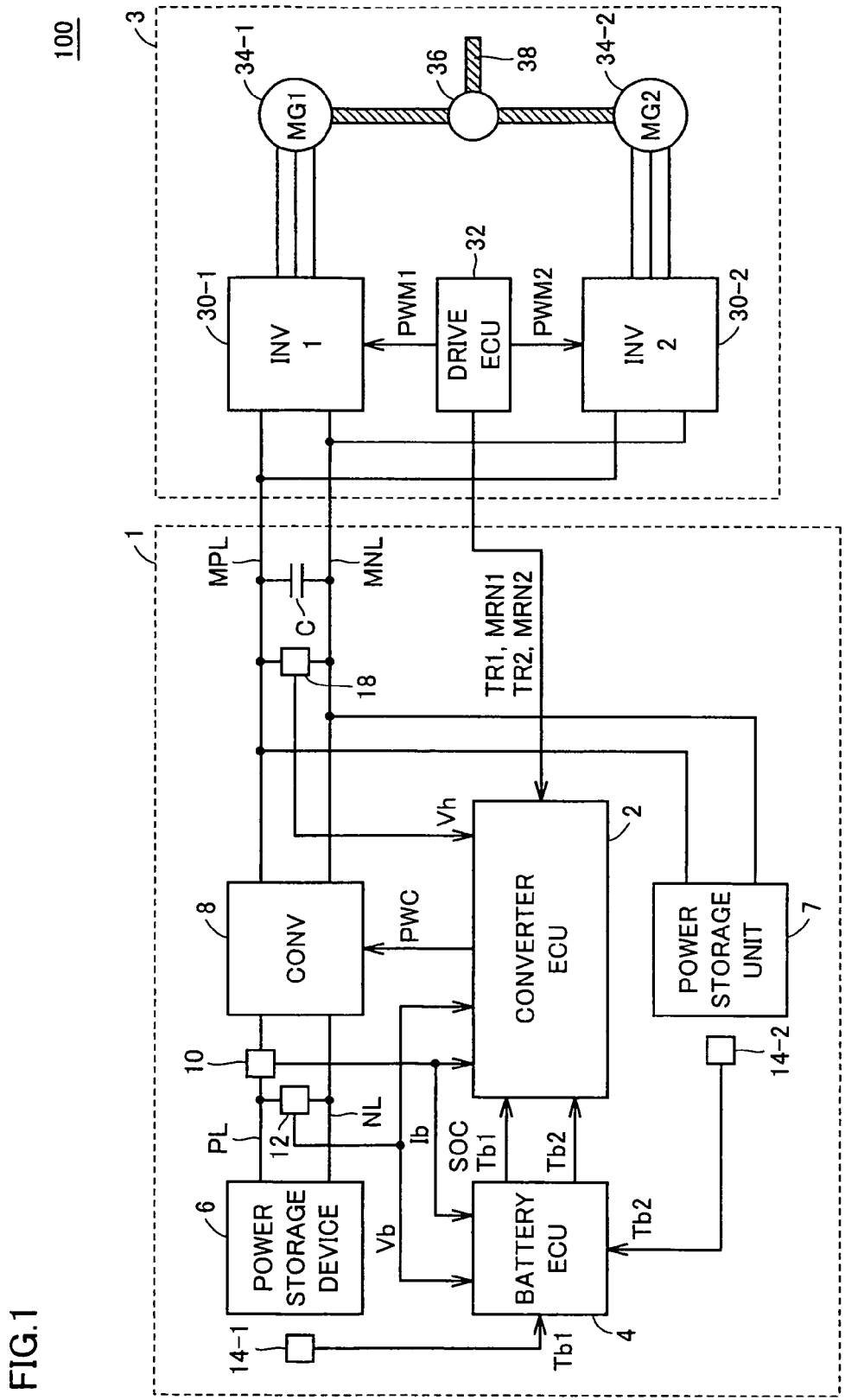
FIG. 1 is an overall block diagram of a vehicle according to a first embodiment of the invention.

FIG. 1 is an overall block diagram of a vehicle according to a first embodiment of the invention. Referring to FIG. 1, a vehicle 100 includes a power supply system 1 and a drive power generating unit 3. Drive power generating unit 3 includes inverters 30-1 and 30-2, motor generators 34-1 and 34-2, a power transmitting mechanism 36, a drive shaft 38 and a drive ECU (Electronic Control Unit) 32.

Inverters 30-1 and 30-2 are connected, in parallel with each other, to a main positive bus line MPL and a main negative bus line MNL. Inverters 30-1 and 30-2 convert an electric drive power (DC power) supplied from power supply system 1 into AC powers, and provide them to motor generators 34-1 and 34-2, respectively. Inverters 30-1 and 30-2 convert the AC powers generated by motor generators 34-1 and 34-2 into DC powers, and provide them, as regenerative powers, to power supply system 1.

Each of inverters 30-1 and 30-2 is formed of a bridge circuit including switching elements for three phases. Inverters 30-1 and 30-2 perform the switching operations according to drive signals PWM1 and PWM2 provided from drive ECU 32, and thereby drive the corresponding motor generators, respectively.

Motor generators 34-1 and 34-2 generate rotational drive forces by receiving the AC powers supplied from inverters 30-1 and 30-2, respectively. Motor generators 34-1 and 34-2 generate the AC powers by externally receiving the rotational forces, respectively. For example, each of motor generators 34-1 and 34-2 is formed of a three-phase AC rotating electric machine having a rotor in which permanent magnets are embedded. Motor generators 34-1 and 34-2 are coupled to power transmitting mechanism 36, and the rotational drive force is transmitted to wheels (not shown) through drive shaft 38 coupled to power transmitting mechanism 36.

When drive power generating unit 3 is employed in a hybrid vehicle, motor generators 34-1 and 34-2 are also coupled to an engine (not shown) through power transmitting mechanism 36 or drive shaft 38. Drive ECU 32 executes the control to achieve an optimum ratio between the drive power generated by the engine and the drive power generated by motor generators 34-1 and 34-2. When drive power generating unit 3 is employed in the hybrid vehicle as described above, one of motor generators 34-1 and 34-2 may operate only as an electric motor, and the other may operate only as a generator.

Drive ECU 32 calculates torque target values TRI and TR2 of motor generators 34-1 and 34-2 as well as revolution speed target values N1 and MRN2 thereof, based on signals transmitted from various sensors (not shown), running situations and an accelerator press-down degree. Drive ECU 32 controls inverter 30-1 by producing drive signal PWM1 so that the generated torque and revolution speed of motor generator 34-1 may attain torque target value TRI and revolution speed target value MRN1, and also controls inverter 30-2 by producing drive signal PWM2 so that the generated torque and revolution speed of motor generator 34-2 may attain torque target value TR2 and revolution speed target value MRN2. Drive ECU 32 provides torque target values TR1 and TR2 as well as revolution speed target values MRN1 and MRN2 thus calculated to a converter ECU 2 (to be described later) of power supply system 1.

Power supply system 1 includes a power storage device 6, a power storage unit 7, a converter 8, a smoothing capacitor C, converter ECU 2, a battery ECU 4, a current sensor 10, voltage sensors 12 and 18, and temperature sensors 14-1 and 14-2.

Power storage device 6 is a chargeable and dischargeable DC power supply, and is formed of a secondary battery such as a nickel hydrogen battery or a lithium-ion battery. Power storage device 6 is connected to converter 8 via positive and negative lines PL and NL. Power storage unit 7 is likewise a chargeable and dischargeable DC power supply, and is formed of, e.g., an electrical double layer capacitor. Power storage unit 7 is connected to main positive bus line MPL and main negative bus line MNL. Power storage device 6 may be formed of a capacitor, and power storage unit 7 may be formed of a secondary battery.

Converter 8 is arranged between power storage device 6 and the pair of main positive bus line MPL and main negative bus line MNL, and performs the voltage conversion between power storage device 6 and the pair of main positive bus line MPL and main negative bus line MNL, based on a drive signal PWC provided from converter ECU 2.

Smoothing capacitor C is connected between main positive bus line MPL and main negative bus line MNL, and reduces electric power variation components included in main positive bus line MPL and main negative bus line MNL. Voltage sensor 18 senses a voltage value Vh of voltage between main positive bus line MPL and main negative bus line MNL, and provides a result of the sensing to converter ECU 2.

Current sensor 10 senses a current value Ib supplied to or from power storage device 6, and provides a result of the sensing to converter ECU 2 and battery ECU 4. Current sensor 10 senses the current supplied from power storage device 6 (discharge current) as a positive value, and senses the current supplied to power storage device 6 (charge current) as a negative value. Although FIG. 1 shows the case where current sensor 10 senses the current value of positive line PL, current sensor 10 may sense the current on negative line NL.

Voltage sensor 12 senses voltage value Vb of power storage device 6, and provides a result of the sensing to converter ECU 2 and battery ECU 4. Temperature sensors 14-1 and 14-2 sense a temperature Tb1 inside power storage device 6 and a temperature Tb2 inside power storage unit 7, and provide results of the sensing to battery ECU 4.

Battery ECU 4 calculates a state quantity SOC indicating a state of charge of power storage device 6 based on current value Ib, voltage value Vb and temperature Tb1 provided from current, voltage and temperature sensors 10, 12 and 14-1, respectively, and provides state quantity SOC thus calculated as well as temperatures Tb1 and Tb2 to converter ECU 2. A method of calculating state quantity SOC may be selected from various known methods.

Converter ECU 2 produces drive signal PWC for driving converter 8 based on various sensed values provided from current sensor 10 and voltage sensors 12 and 18, temperatures Tb1 and Tb2 as well as state quantity SOC provided from battery ECU 4, and torque target values TR1 and TR2 as well as revolution speed target values MRN1 and MRN2 provided from drive ECU 32. Converter ECU 2 provides drive signal PWC thus produced to converter 8 for controlling converter 8. Converter ECU 2 has a structure which will be described later in detail.

Figure 2:
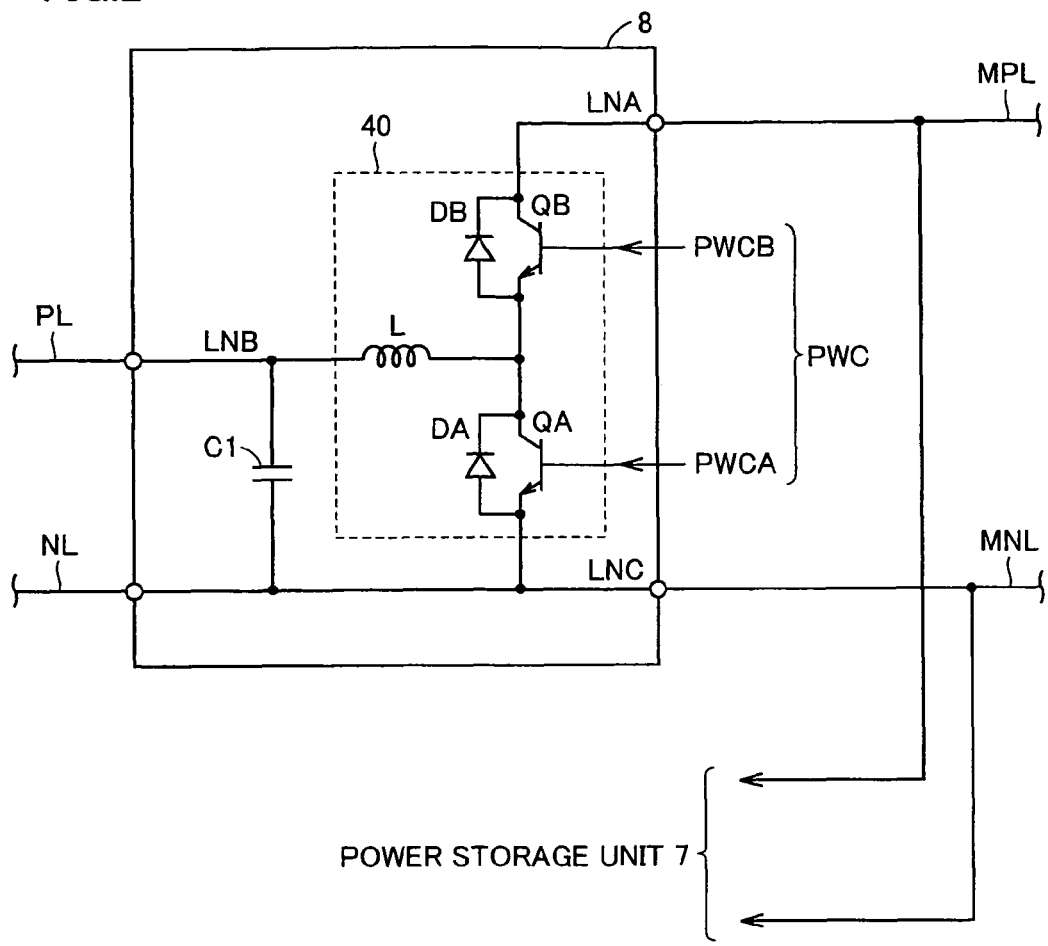
FIG. 2 is a schematic structural diagram of a converter shown in FIG. 1.

FIG. 2 is a schematic structural view of converter 8 shown in FIG. 1. Referring to FIG. 2, converter 8 includes a chopper circuit 40, positive and negative bus lines LNA and LNC, a line LNB and a smoothing capacitor C1. Chopper circuit 40 includes transistors QA and QB, diodes DA and DB, and an inductor L.

Positive bus line LNA has one and the other ends connected to a collector of transistor QB and main positive bus line MPL, respectively. Negative bus line LNC has one and the other ends connected to negative line NL and main negative bus line MNL, respectively.

Transistors QA and QB are connected in series between negative and positive bus lines LNC and LNA. More specifically, an emitter of transistor QA is connected to negative bus line LNC, and a collector of transistor QB is connected to positive bus line LNA. Diodes DA and DB are connected in anti-parallel to transistors QA and QB, respectively. Inductor L is connected to a node between transistors QA and QB.

Line LNB has one and the other ends connected to positive line PL and inductor L, respectively. Smoothing capacitor C1 is connected between line LNB and negative bus line LNC, and reduces AC components included in the DC voltage placed between line LNB and negative bus line LNC.

Chopper circuit 40 boosts the DC power (drive power) received from positive and negative lines PL and NL according to drive signal PWC provided from converter ECU 2 (not shown) when power storage device 6 is discharged, and steps down the DC power (regenerative power) received from main positive bus line MPL and main negative bus line MNL according to drive signal PWC when power storage device 6 is charged.

The voltage converting operations (boosting and stepping-down operations) of converter 8 will now be described. In the boosting operation, converter ECU 2 keeps transistor QB off, and turns on/off transistor QA at a predetermined duty ratio. When transistor QA is on, the discharge current flows from power storage device 6 to main positive bus line MPL via inductor L, diode DB and positive bus line LNA. At the same time, a pump current flows from power storage device 6 through line LNB, inductor L, transistor QA and negative bus line LNC. Inductor L accumulates electromagnetic energy by the pump current. When transistor QA changes from the on state to the off state, inductor L superimposes the accumulated electromagnetic energy on the discharge current. Consequently, the average voltage of the DC power supplied from converter 8 to main positive bus line MPL and main negative bus line MNL is boosted by a magnitude corresponding to the electromagnetic energy accumulated in inductor L according to the duty ratio.

In the step-down operation, converter ECU 2 turns on/off transistor QB at a predetermined duty ratio, and keeps transistor QA off. When transistor QB is on, the charge current flows from main positive bus line MPL to power storage device 6 via positive bus line LNA, transistor QB, inductor L and line LNB. When transistor QB changes from the on state to the off state, inductor L generates a magnetic flux that tends to prevent changes in current so that the charge current continues flowing through diode DA, inductor L and line LNB. From the viewpoint of electric energy, the DC power is supplied from main positive bus line MPL and main negative bus line MNL only during the on period of transistor QB. Therefore, assuming that the charge current is kept constant (i.e., inductor L has a sufficiently large inductance), the average voltage of the DC power supplied from converter 8 to power storage device 6 is equal to a value obtained by multiplying the DC voltage between main positive bus line MPL and main negative bus line MNL by the duty ratio.

For controlling the above voltage converting operation of converter 8, converter ECU 2 produces drive signal PWC that is formed of a drive signal PWCA for controlling on/off of transistor QA and a drive signal PWCB for controlling on/off of transistor QB.

Figure 3:
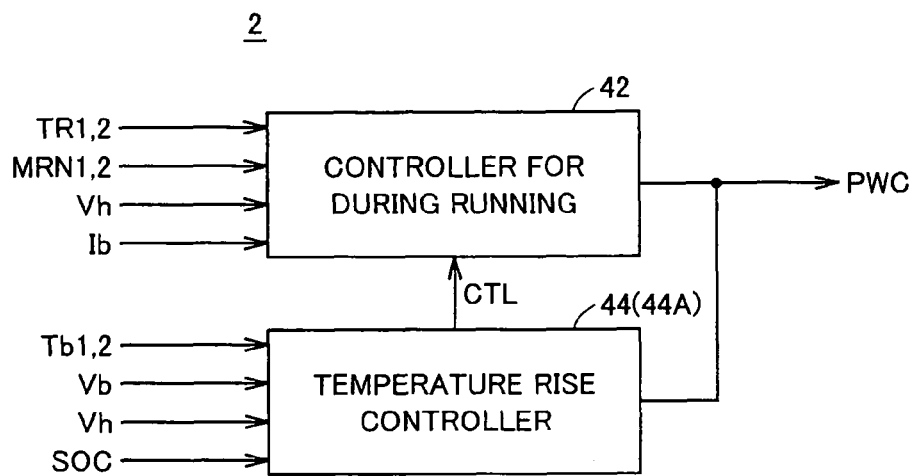
FIG. 3 is a functional block diagram of a converter ECU shown in FIG. 1.

FIG. 3 is a functional block diagram of converter ECU 2 shown in FIG. 1. Referring to FIG. 3, converter ECU 2 includes a controller for during running 42 and a temperature rise controller 44.

Controller for during running 42 receives torque target values TR1 and TR2 as well as revolution speed target values MRN1 and MRN2 of motor generators 34-1 and 34-2 from drive ECU 32, respectively. Controller for during running 42 receives voltage value Vh from voltage sensor 18, and receives current value Ib from current sensor 10.

When a control signal CTL provided from temperature rise controller 44 is inactive, i.e., when temperature rise controller 44 is not executing the temperature rise control, controller for during running 42 operates based on the above signals to produce drive signal PWC for driving converter 8 and to provide drive signal PWC thus produced to converter 8. When control signal CTL is active, i.e., when temperature rise controller 44 is executing the temperature rise control, controller for during running 42 stops production of drive signal PWC.

Temperature rise controller 44 receives temperatures Tb1 and Tb2 as well as state quantity SOC from battery ECU 4. Temperature rise controller 44 receives voltage value Vb from voltage sensor 12, and receives voltage value Vh from voltage sensor 18. When one of temperatures Tb1 and Tb2 is lower than a prescribed value, temperature rise controller 44 executes the temperature rise control to raise the temperatures of power storage device 6 and power storage unit 7 by transmitting the electric power between power storage device 6 and power storage unit 7 through converter 8 as well as main positive bus line MPL and main negative bus line MNL.

More specifically, when one of temperatures Tb1 and Tb2 is lower than the prescribed value, temperature rise controller 44 produces drive signal PWC based on the various signals already described by a method to be described later. Temperature rise controller 44 provides drive signal PWC thus produced to converter 8, and activates control signal CTL provided to controller for during running 42.

Figure 4:
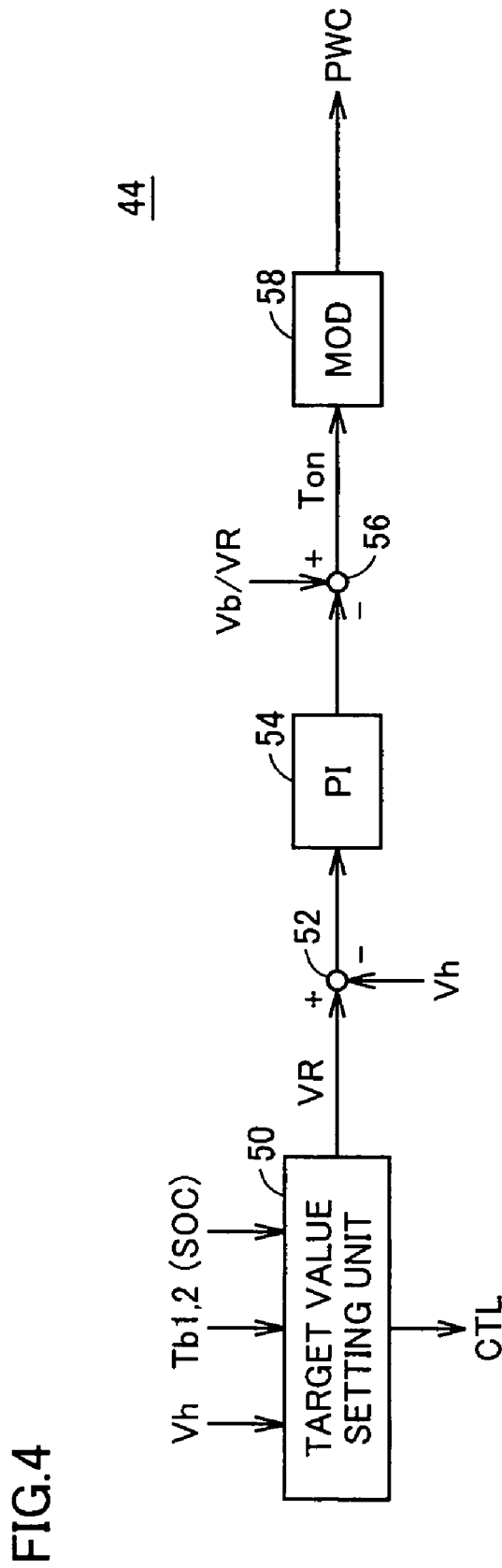
FIG. 4 is a functional block diagram specifically showing a temperature rise controller shown in FIG. 3.

FIG. 4 is a functional block diagram specifically showing temperature rise controller 44 shown in FIG. 3. Referring to FIG. 4, temperature rise controller 44 includes a target value setting unit 50, subtractors 52 and 56, a PI controller 54 and a modulator 58.

Target value setting unit 50 determines based on temperatures Tb1 and Tb2 whether the temperature rise control of power storage device 6 and power storage unit 7 is to be executed or not. When the temperature rise control is to be executed, target value setting unit 50 activates control signal CTL provided to controller for during running 42 shown in FIG. 3. In the temperature rise control operation, target value setting unit 50 produces a target voltage VR of converter 8 based on voltage value Vh by the method to be described later, and provides target voltage VR thus produced to subtractor 52.

Subtractor 52 subtracts voltage value Vh from target voltage VR provided from target value setting unit 50, and provides a result of this operation to PI controller 54. PI controller 54 performs a proportional integral operation using, as an input, a difference between target voltage VR and voltage value Vh, and provides a result of this operation to subtractor 56. Subtractor 56 subtracts an output of PI controller 54 from an inverse of a theoretical boost ratio of converter 8 represented by (voltage value Vb)/(target voltage VR), and provides, as a duty command Ton, a result of this operation to modulator 58. The input term of subtractor 56, i.e., (voltage value Vb)/(target voltage VR) is a feed-forward compensation term based on the theoretical boost ratio of converter 8.

Modulator 58 produces a PWM (Pulse Width Modulation) signal for driving converter 8, based on duty command Ton and a carrier wave produced by an oscillator (not shown), and provides the produced PWM signal, as drive signal PWC, to transistors QA and QB of converter 8.

Figure 5:
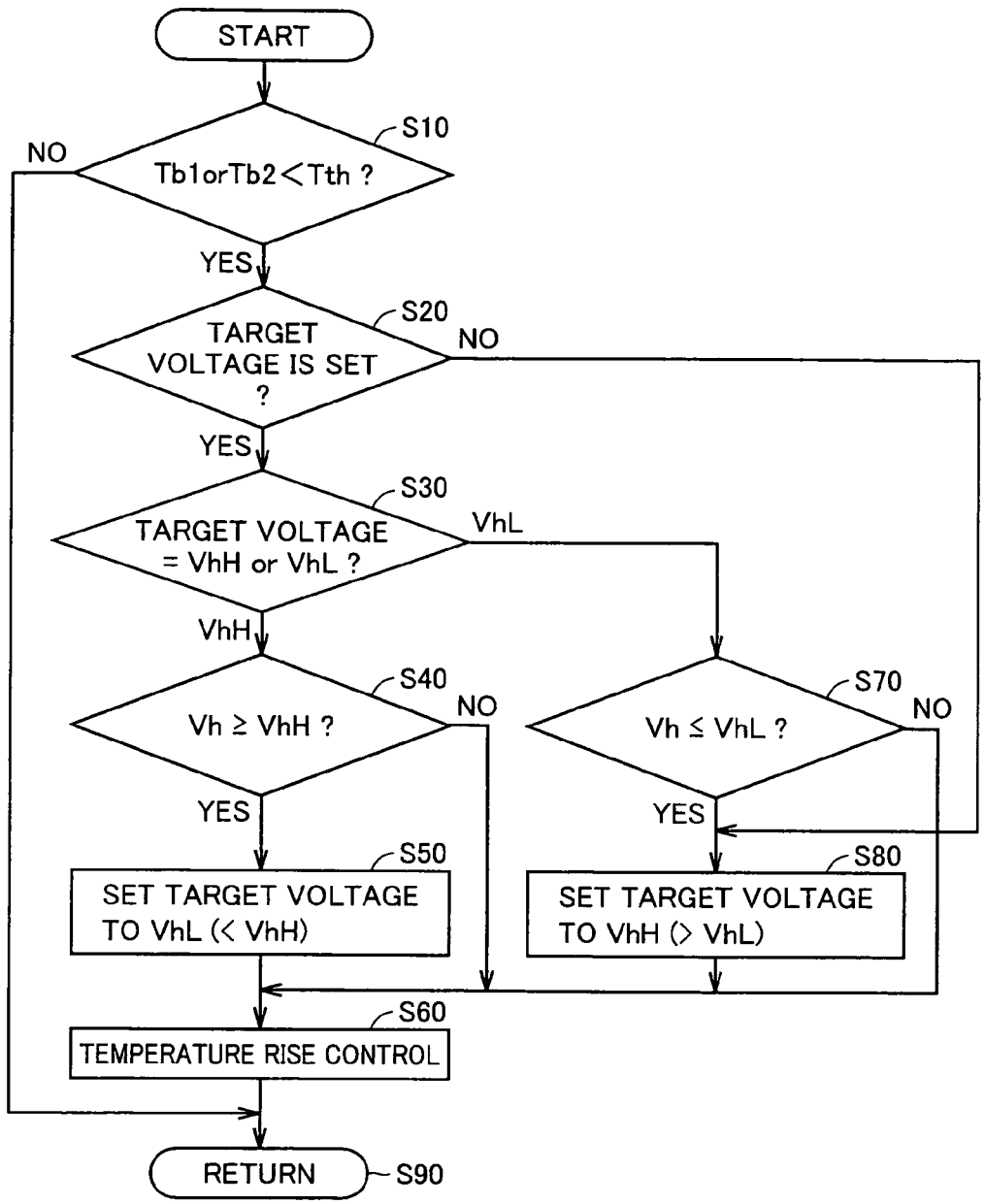
FIG. 5 is a flowchart illustrating temperature rise control by the temperature rise controller shown in FIG. 4.

FIG. 5 is a flowchart of the temperature rise control by temperature rise controller 44 shown in FIG. 4. The processing shown in this flowchart is called for execution from a main routine at predetermined time intervals or when predetermined conditions are satisfied (e.g., when the system starts).

Referring to FIGS. 4 and 5, target value setting unit 50 determines whether temperature Tb1 sensed by temperature sensor 14-1 or temperature Tb2 sensed by temperature sensor 14-2 is lower than a preset threshold temperature Tth, e.g., of −10° C. or not (step S10). When target value setting unit 50 determines that both temperatures Tb1 and Tb2 are equal to or larger than threshold temperature Tth (NO in step S10), it advances the process to step S90, and deactivates control signal CTL provided to controller for during running 42 (FIG. 3).

When it is determined in step S10 that temperature Tb1 or Tb2 is lower than threshold temperature Tth (YES in step S10), target value setting unit 50 activates control signal CTL provided to controller for during running 42. Target value setting unit 50 determines whether target voltage VR of converter 8 is already set or not (step S20). When target value setting unit 50 determines that target voltage VR is not set (NO in step S20), it advances the process to step S80 to be described later.

When it is determined in step S20 that target voltage VR is set (YES in step S20), target value setting unit 50 determines whether target voltage VR is equal to a first voltage value VhH, or is equal to a second voltage value VhL lower than value VhH (step S30).

When it is determined in step S30 that target voltage VR is equal to first voltage value VhH, target value setting unit 50 determines whether voltage value Vh is equal to or larger than first voltage value VhH or not (step S40). When target value setting unit 50 determines that voltage value Vh is equal to or larger than first voltage value VhH (YES in step S40), it sets target voltage VR to second voltage value VhL smaller than value VhH (step S50). When target value setting unit 50 determines that voltage value Vh is lower than first voltage value VhH (NO in step S40), it advances the process to step S60 without executing the processing in step S50.

Thus, target value setting unit 50 changes target voltage VR to second voltage value VhL lower than first voltage value VhH when voltage value Vh becomes equal to or higher than first voltage value VhH while target voltage VR is equal to first voltage value VhH.

Temperature rise controller 44 drives converter 8 by producing drive signal PWC based on target voltage VR, and actually executes the temperature rise control (step S60).

Conversely, when it is determined in step S30 that target voltage VR is equal to second voltage value VhL, target value setting unit 50 determines whether voltage value Vh is equal to or lower than second voltage value VhL or not (step S70). When target value setting unit 50 determines that voltage value Vh is equal to or lower than second voltage value VhL (YES in step S70), it sets target voltage VR to first voltage value VhH higher than value VhL (step S80). When target value setting unit 50 determines that voltage value Vh is higher than second voltage value VhL (NO in step S70), it advances the process to step S60 without executing the processing in step S80.

Thus, target value setting unit 50 changes target voltage VR to first voltage value VhH higher than second voltage value VhL when voltage value Vh becomes equal to or lower than second voltage value VhL while target voltage VR is equal to second voltage value VhL.

Figure 6:
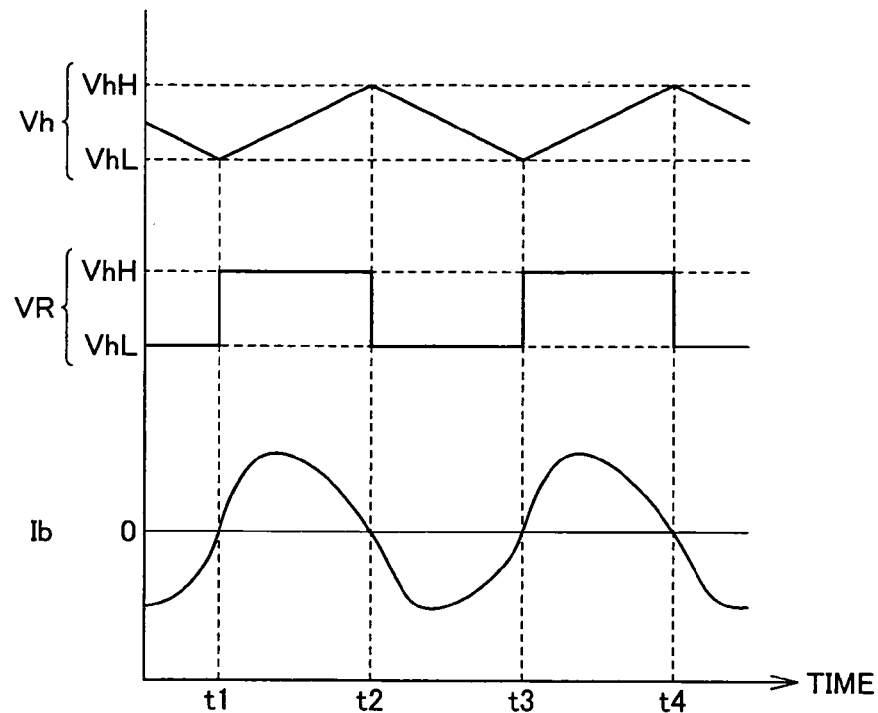
FIG. 6 is a waveform diagram showing voltages and a current exhibited during temperature rise control.

FIG. 6 is a waveform diagram illustrating voltages and a current exhibited during the temperature rise control. Referring to FIG. 6, target voltage VR is equal to second voltage value VhL before a time t1. When voltage value Vh reaches second voltage value VhL at time t1, target voltage VR is set to first voltage value VhH. Thus, target voltage VR changes from second voltage value VhL to first voltage value VhH higher than second voltage value VhL.

Thereby, voltage value Vh starts to rise toward first voltage value VhH. In this operation, converter 8 operates to pass the current from power storage device 6 to main positive bus line MPL and main negative bus line MNL (current value Ib is positive). More specifically, the electric power flows from power storage device 6 to power storage unit 7 through converter 8 and main positive bus line MPL and main negative bus line MNL so that internal heating of power storage device 6 and power storage unit 7 raises the temperatures of power storage device 6 and power storage unit 7.

At a time t2, voltage value Vh reaches first voltage value VhH so that target voltage VR is set to second voltage value VhL. Thus, target voltage VR changes from first voltage value VhH to second voltage value VhL lower than first voltage value VhH.

Thereby, voltage value Vh lowers toward second voltage value VhL. During this operation, converter 8 operates to pass the current from main positive bus line MPL and main negative bus line MNL to power storage device 6 (current value Ib is negative). Thus, the electric power flows from power storage unit 7 to power storage device 6 through main positive bus line MNL and main negative bus line MNL as well as converter 8 so that the temperatures rise in power storage device 6 and power storage unit 7.

After a time t3, target voltage VR changes in the similar manner until temperatures Tb1 and Tb2 exceed the prescribed temperatures, and the temperature rise control is executed until the electric power is transmitted between power storage device 6 and power storage unit 7.

First and second voltage values VhH and VhL defining the control range of voltage value Vh may be arbitrarily set within a range that is not higher than the upper voltage limit values of main positive bus line MPL and main negative bus line MNL and is not lower than the voltage of power storage device 6. Further, first and second voltage values VhH and VhL may be variable depending on the states of power storage device 6 and power storage unit 7.

For example, when the temperature is extremely low, the capacitance of power storage device 6 is significantly small so that the temperature rise control must be executed as efficiently as possible. When the SOC of power storage device 6 is low, it is likewise necessary to execute the temperature rise control as efficiently as possible.

Figure 7:
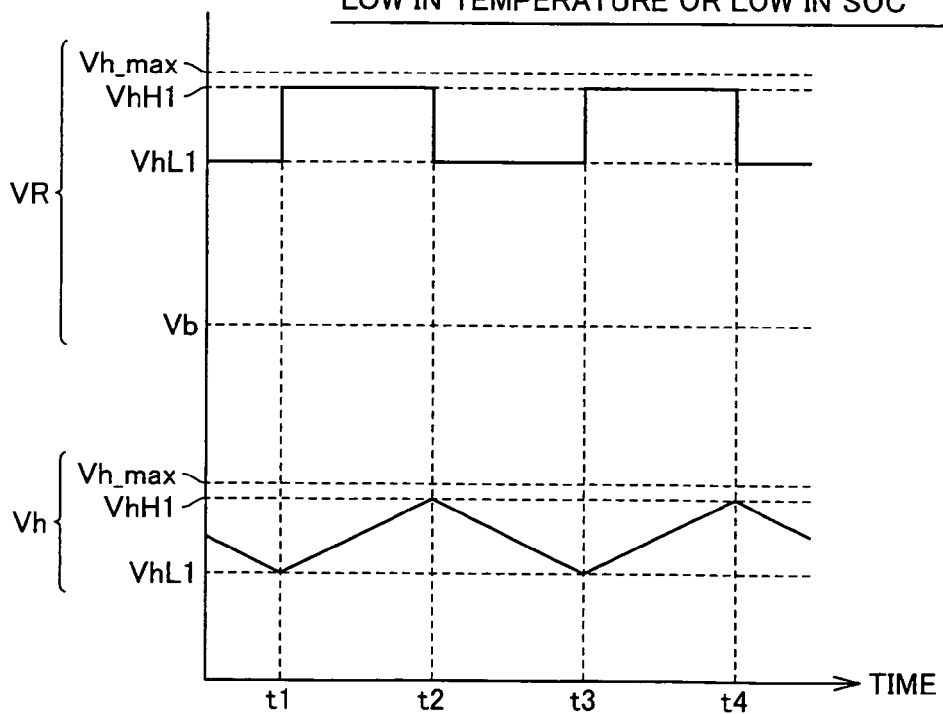
FIG. 7 shows voltage setting for implementing efficient temperature rise control as well as voltage waveforms for it.

FIG. 7 shows voltage setting for implementing efficient temperature rise control as well as voltage waveforms for it. Referring to FIG. 7, first and second voltage values VhH and VhL are set to larger values as the temperature of power storage device 6 lowers, or as the SOC of power storage device 6 lowers. For example, as shown in FIG. 7, when the temperature of power storage device 6 is extremely low or its SOC is low, first and second voltage values VhH1 and VhL1 are set close to a upper voltage limit value Vh_max of main positive bus line MPL and main negative bus line MNL.

By this voltage setting, voltage value Vh of main positive bus line MNL and main negative bus line MNL is controlled to be relative high within its controllable range (Vb ≦Vh≦Vh_max). Therefore, assuming that the charge/discharge current of power storage device 6 is constant, the charge/discharge current of power storage unit 7 connected to main positive bus line MPL and main negative bus line MNL is small so that the loss in power storage unit 7 (i.e., loss due to internal resistances) can be suppressed.

Conversely, the temperature rise of power storage unit 7 is to be performed preferentially in some cases.

Figure 8:
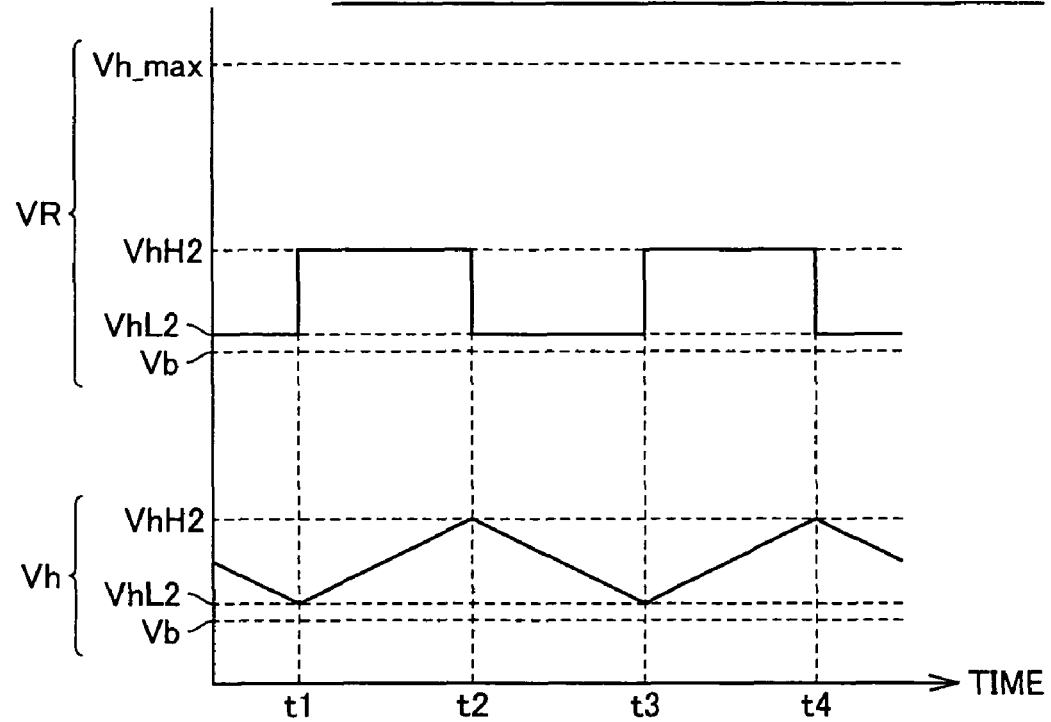
FIG. 8 shows voltage setting performed when the temperature rise of the power storage unit is to be performed preferentially as well as voltage waveforms for it.

FIG. 8 shows voltage setting performed when the temperature rise of power storage unit 7 is to be performed preferentially as well as voltage waveforms for it. Referring to FIG. 8, when the temperature rise of power storage unit 7 is to be performed preferentially, first and second voltage values VhH2 and VhL2 are set to small values. For example, as shown in FIG. 8, first and second voltage values VhH2 and VhL2 are set close to voltage value Vb of power storage device 6.

By this voltage setting, voltage value Vh of main positive bus line MPL and main negative bus line MNL is controlled to be relative low within its controllable range (Vb ≦Vh≦Vh_max). Therefore, assuming that the charge/discharge current of power storage device 6 is constant, the charge/discharge current of power storage unit 7 is large so that the loss in power storage unit 7 (i.e., loss due to internal resistances) is large. This promotes the temperature rise of power storage unit 7.

In the above description, target voltage VR is set to first or second voltage value VhH or VhL. However, target voltage VR may be set higher than first voltage value VhH or lower than second voltage value VhL. In the case where target voltage VR is set higher than first voltage value VhH, target voltage VR will be changed to a value lower than second voltage value VhL when voltage value Vh reaches first voltage value VhH. In the case where target voltage VR is set lower than second voltage value VhL, target voltage VR will be changed to a value higher than first voltage value VhH when voltage value Vh reaches second voltage value VhL.

According to the first embodiment, as described above, converter 8 is arranged between power storage device 6 and the pair of main positive bus line MPL and main negative bus line MNL, and power storage unit 7 is connected to main positive bus line MPL and main negative bus line MNL. In the temperature rise control, when voltage value Vh reaches the lower limit value (second voltage value VhL), converter ECU 2 (temperature rise controller 44) sets target voltage VR such that converter 8 passes the electric power from power storage device 6 through main positive bus line MPL and main negative bus line MNL to power storage unit 7. When voltage value Vh reaches the upper limit value (first voltage value VhH) in the above temperature rise control, converter ECU 2 sets target voltage VR such that converter 8 passes the electric power from power storage unit 7 through main positive bus line MPL and main negative bus line MNL to power storage device 6. Therefore, the electric power can be transmitted between power storage device 6 and power storage unit 7 without transmitting the electric power between power supply system 1 and drive power generating unit 3, while controlling voltage value Vh to fall within the range defined by first and second voltage values VhH and VhL.

According to the first embodiment, therefore, the temperatures of power storage device 6 and power storage unit 7 can be raised before power supply system 1 starts the electric power transmission to/from drive power generating unit 3. Consequently, it is possible to start ensuring the sufficient charge/discharge characteristics of power storage device 6 and power storage unit 7 at the start of running of vehicle 100, even when the temperature is low.

Further, the first embodiment can prevent placing of an over-voltage between main positive bus line MPL and main negative bus line MNL. Consequently, various units (smoothing capacitor C and inverters 30-1 and 30-2) connected to main positive bus line MPL and main negative bus line MNL can be protected from over-voltage breakdown.

Second Embodiment

Although temperature rise controller 44 is formed of the voltage control system in the first embodiment, a temperature rise controller in the second embodiment is formed of a current control system.

Overall structures of the vehicle and converter ECU according to the second embodiment are the same as those of vehicle 100 and converter ECU 2 shown in FIGS. 1 and 3.

Figure 9:
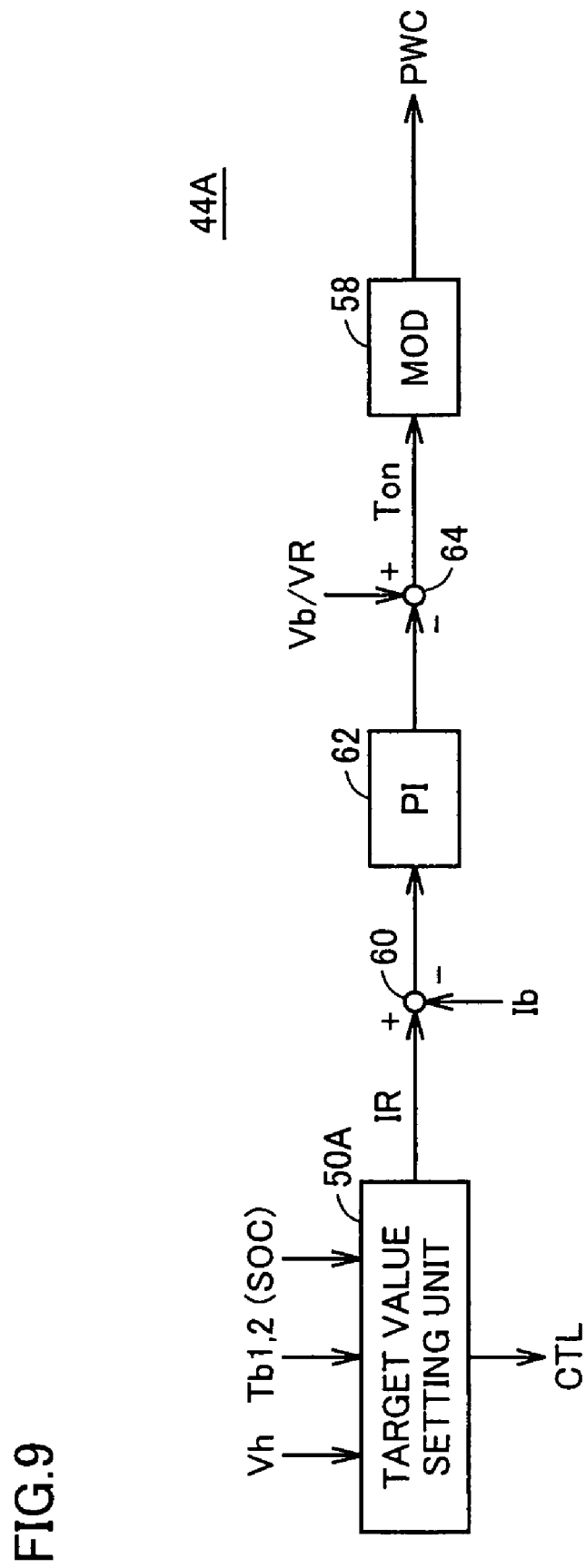
FIG. 9 is a functional block diagram specifically showing a temperature rise controller of a second embodiment.

FIG. 9 is a functional block diagram specifically showing a temperature rise controller of the second embodiment. Referring to FIG. 9, a temperature rise controller 44A includes a target value setting unit 50A, subtractors 60 and 64, a PI controller 62 and modulator 58.

During the temperature rise control operation, target value setting unit 50A produces a target current IR of converter 8 based on voltage value Vh by the method to be described later, and provides target current IR thus produced to subtractor 60. Other functions of target value setting unit 50A are the same as those of target value setting unit 50 in the first embodiment.

Subtractor 60 subtracts current value Ib from target current IR provided from target value setting unit 50A, and provides a result of this operation to PI controller 62. PI controller 62 performs a proportional integral operation using, as an input, a difference between target current IR and current value Ib, and provides a result of this operation to subtractor 64. Subtractor 64 subtracts an output of PI controller 62 from an inverse of the theoretical boost ratio of converter 8 represented by (voltage value Vb)/(target voltage VR), and provides, as duty command Ton, a result of this operation to modulator 58. Modulator 58 is already described in connection with the first embodiment.

Figure 10:
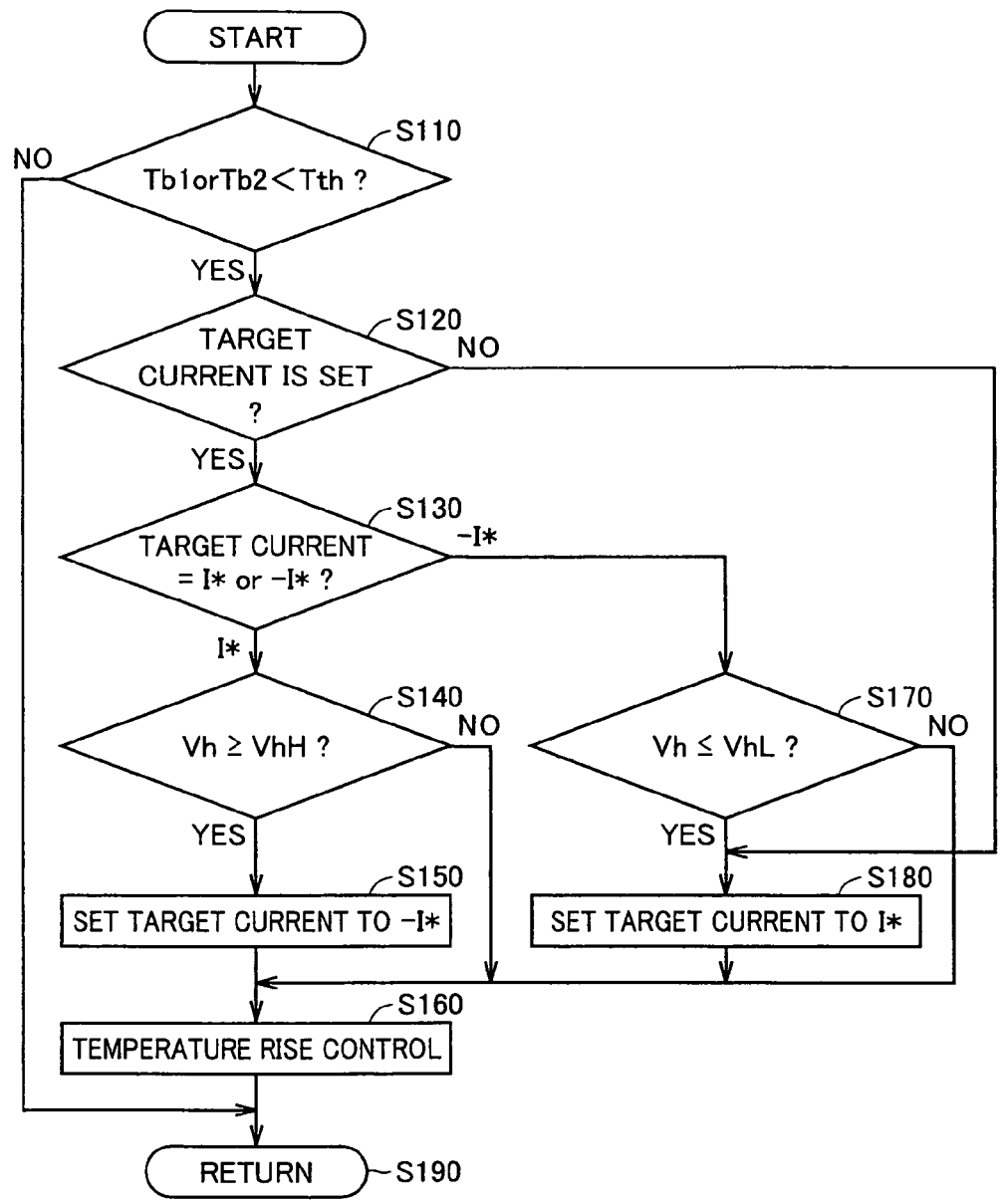
FIG. 10 is a flowchart of temperature rise control by temperature rise controller shown in FIG. 9.

FIG. 10 is a flowchart of the temperature rise control by temperature rise controller 44A shown in FIG. 9. The processing shown in this flowchart is called for execution from a main routine at predetermined time intervals or when predetermined conditions are satisfied (e.g., when the system starts).

Referring to FIGS. 9 and 10, target value setting unit 50A determines whether temperature Tb1 or Tb2 is lower than preset threshold temperature Tth, e.g., of −10° C. or not (step S110). When target value setting unit 50A determines that both temperatures Tb1 and Tb2 are equal to or larger than threshold temperature Tth (NO in step S110), it advances the process to step S190, and deactivates control signal CTL provided to controller for during running 42 (FIG. 3).

When it is determined in step S110 that temperature Tb1 or Tb2 is lower than threshold temperature Tth (YES in step S110), target value setting unit 50A activates control signal CTL provided to controller for during running 42. Target value setting unit 50A determines whether target current IR of converter 8 is already set or not (step S120). When target value setting unit 50A determines that target current IR is not set (NO in step S120), it advances the process to step S180 to be described later.

When it is determined in step S120 that target current IR is set (YES in step S120), target value setting unit 50A determines whether target current IR is equal to a first current value I* (which is positive), or is equal to a second current value (−I*) (step S130).

When it is determined in step S130 that target current IR is equal to first current value I*, target value setting unit 50A determines whether voltage value Vh is equal to or larger than first voltage value VhH or not (step S140). When target value setting unit 50A determines that voltage value Vh is equal to or larger than first voltage value VhH (YES in step S140), it sets target current IR to second current value (−I*) in step S150. When target value setting unit 50A determines that voltage value Vh is lower than first voltage value VhH (NO in step S140), it advances the process to step S160 without executing the processing in step S150.

Thus, target value setting unit 50A changes target current IR to second current value (−I*) when voltage value Vh becomes equal to or higher than first voltage value VhH while target current IR is equal to first current value I*.

Temperature rise controller 44A drives converter 8 by producing drive signal PWC based on target current IR, and actually executes the temperature rise control (step S160).

Conversely, when it is determined in step S130 that target current IR is equal to second current value (−I*), target value setting unit 50A determines whether voltage value Vh is equal to or lower than second voltage value VhL(<VhH) or not (step S170). When target value setting unit 50A determines that voltage value Vh is equal to or lower than second voltage value VhL (YES in step S170), it sets target current IR to first current value I* (step S180). When target value setting unit 50A determines that voltage value Vh is higher than second voltage value VhL (NO in step S170), it advances the process to step S160 without executing the processing in step S180.

Thus, target value setting unit 50A changes target current IR to first current value I* when voltage value Vh becomes equal to or lower than second voltage value VhL while target current IR is equal to second current value (−I*).

Figure 11:
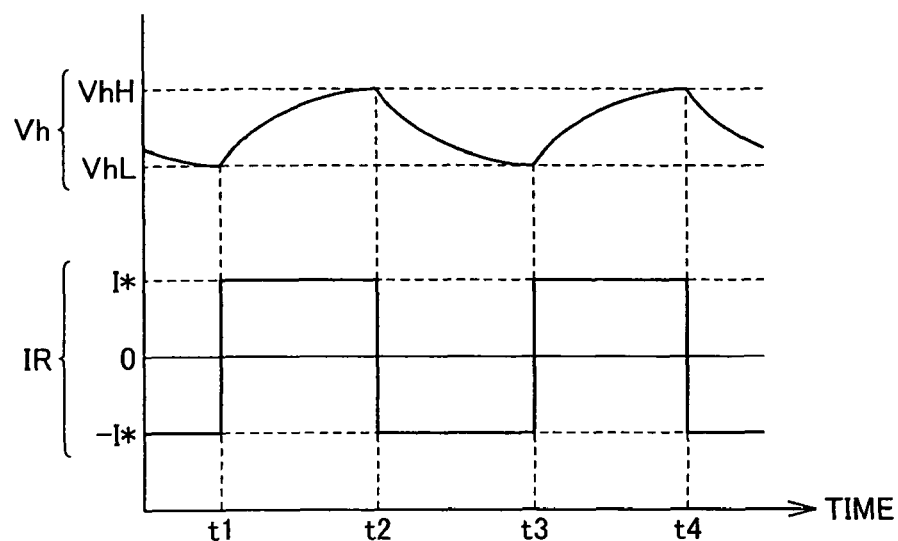
FIG. 11 is a waveform diagram showing voltages and currents during the temperature rise control.

FIG. 11 is a waveform diagram showing voltages and currents exhibited during the temperature rise control. Referring to FIG. 11, target current IR is equal to second current value (−I*) before time t1. When voltage value Vh reaches second voltage value VhL at time t1, target current IR is set to first current value I*. Thus, target current IR changes from second current value (−I*) to first current value I*.

Thereby, voltage value Vh starts to rise toward first voltage value VhH. In this operation, converter 8 operates to pass the current corresponding to first current value I* from power storage device 6 to main positive bus line MPL and main negative bus line MNL. More specifically, the electric power flows from power storage device 6 to power storage unit 7 through converter 8 and main positive bus line MPL and main negative bus line MNL so that internal heating of power storage device 6 and power storage unit 7 raises the temperatures of power storage device 6 and power storage unit 7.

At time t2, voltage value Vh reaches first voltage value VhH so that target current IR is set to second current value (−I*). Thus, target current IR changes from first current value I* to second current value (−I*).

Thereby, voltage value Vh lowers toward second voltage value VhL. During this operation, converter 8 operates to pass the current corresponding to second current value (−I*) from main positive bus line MPL and main negative bus line MNL to power storage device 6. Thus, the electric power flows from power storage unit 7 to power storage device 6 through main positive bus line MPL and main negative bus line MNL as well as converter 8 so that the temperatures rise in power storage device 6 and power storage unit 7.

After time t3, target current IR changes in the similar manner until temperatures Th1 and Tb2 exceed the prescribed temperatures, and the temperature rise control is executed by supplying/receiving the electric power between power storage device 6 and power storage unit 7.

Likewise, in the second embodiment, first and second voltage values VhH and VhL can be set arbitrarily within a range that is not higher than the upper voltage limit values of main positive bus line MPL and main negative bus line MNL and is not lower than the voltage of power storage device 6. Further, first and second voltage values VhH and VhL can likewise be variable depending on the states of power storage device 6 and power storage unit 7.

Figure 12:
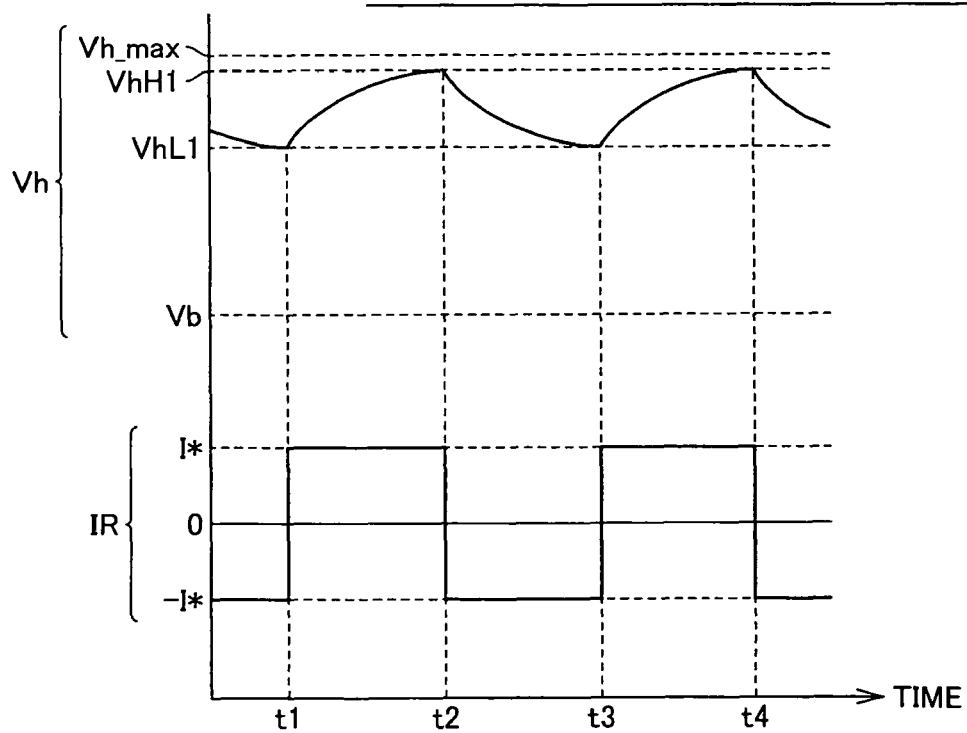
FIG. 12 shows voltage setting for achieving efficient temperature rise control as well as voltage and current waveforms for it.

FIG. 12 shows voltage setting for implementing efficient temperature rise control as well as voltage and current waveforms for it. Referring to FIG. 12, first and second voltage values VhH and VhL are set to larger values as the temperature of power storage device 6 lowers, or as the SOC of power storage device 6 lowers. For example, as shown in FIG. 12, when the temperature of power storage device 6 is extremely low or its SOC is low, first and second voltage values VhH1 and VhL1 are set close to upper voltage limit value Vh_max of main positive bus line MPL and main negative bus line MNL.

Figure 13:
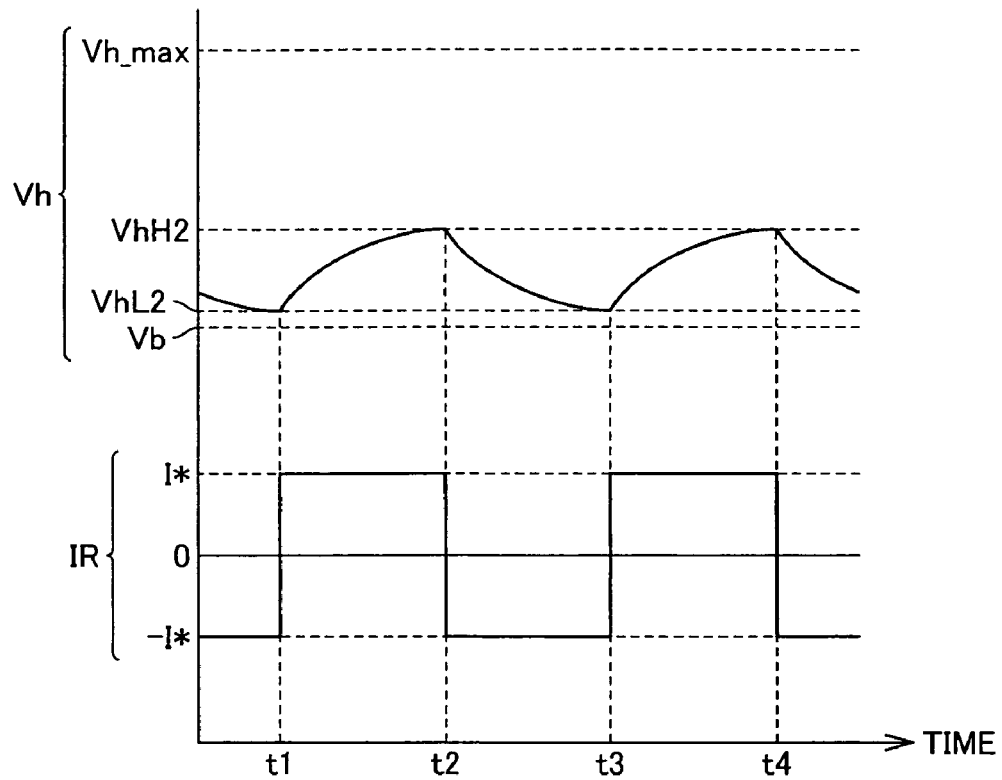
FIG. 13 shows voltage setting performed when the temperature rise of the power storage unit is to be performed preferentially as well as voltage waveforms for it.

FIG. 13 shows voltage setting performed when the temperature rise of power storage unit 7 is to be performed preferentially as well as voltage waveforms for it. Referring to FIG. 13, when the temperature rise of power storage unit 7 is to performed preferentially, first and second voltage values VhH2 and VhL2 are set to small values. For example, as shown in FIG. 13, first and second voltage values VhH2 and VhL2 are set close to voltage value Vb of power storage device 6.

In the above description, second current value (−I*) is equal to a value obtained by inverting the sign of first current value I*. However, it is not necessary that the magnitude (absolute value) of the second current value (negative value) is equal to the first current value (positive value).

In the second embodiment, as described above, temperature rise controller 44A is formed of the current control system so that it is possible to set the current value (power value) that is provided to or from the power storage device 6 in the temperature rise control operation. Accordingly, the second embodiment allows easy management of the SOC of power storage device 6 in the temperature rise control operation. Also, the temperature rising speed can be controlled according to the magnitude of the target current.

In each of the embodiments already described, the electric power is transmitted between power storage device 6 and power storage unit 7 in the temperature rise control operation. However, power storage unit 7 may be replaced with smoothing capacitor C, and power storage device 6 may be heated by transmitting the electric power between power storage device 6 and smoothing capacitor C.

In the above description, power supply system 1 includes power storage device 6 and power storage unit 7. However, it may further include more power storage units connected, in parallel with each other, to power storage unit 7. In this structure, the temperature rise control can be implemented by transmitting the electric power between power storage device 6 and the plurality of power storage units.

In the above embodiments, temperature rise controllers 44 and 44A shown in FIGS. 4 and 9 may be formed of circuits that have functions corresponding to the respective blocks, or may be implemented by converter ECU 2 that executes the processing according to preset programs. In the latter case, a CPU (Central Processing Unit) controls temperature rise controllers 44 and 44A described above. The CPU reads, from a ROM (Read Only Memory), the programs for executing the processing represented by the foregoing function blocks and flow charts, and executes the programs thus read to execute the processing according to the foregoing functional blocks and flowcharts. Therefore, the ROM corresponds to a computer-readable (CPU-readable) recording medium that bears the programs for executing the processing illustrated in the foregoing functional blocks and flowchart.

In the above description, power storage device 6 corresponds to a "power storage device" in the invention, and power storage unit 7 corresponds to a "power storage unit" in the invention. Main positive bus line MPL and main negative bus line MNL correspond to a "power line" in the invention, and converter ECU 2 corresponds to a "control device" in the invention. Further, voltage sensor 18 corresponds to a "voltage sensor" in the invention, and inverters 30-1 and 30-2 as well as motor generators 34-1 and 34-2 form a "drive power generating unit" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply system capable of supplying an electric power to a load device, comprising:
    a chargeable and dischargeable power storage device;
    a power line configured to be capable of supplying and receiving the electric power between the power supply system and said load device;
    a converter arranged between said power storage device and said power line for performing voltage conversion between said power storage device and said power line;
    a chargeable and dischargeable power storage unit connected to said power line;
    a control device controlling said converter by setting a predetermined target value; and
    a voltage sensor sensing a voltage on said power line, wherein
    during temperature rise control for raising a temperature of at least one of said power storage device and said power storage unit, said control device sets said target value such that said converter passes the electric power from said power storage device through said power line to said power storage unit when the voltage sensed by said voltage sensor reaches a lower limit value, and sets said target value such that said converter passes the electric power from said power storage unit through said power line to said power storage device when said sensed voltage reaches an upper limit value.

2. The power supply system according to claim 1, wherein said upper and lower limit values are set according to a state of said power storage device.

3. The power supply system according to claim 2, wherein said upper and lower limit values are set to larger values as the temperature of said power storage device lowers.

4. The power supply system according to claim 2, wherein said upper and lower limit values are set to larger values as a state quantity representing a state of charge of said power storage device decreases.

5. The power supply system according to claim 1, wherein said upper and lower limit values are set to values being close to and not exceeding the voltage upper limit value of said power line.

6. The power supply system according to claim 1, wherein said upper and lower limit values are set to values being close to and not lower than a voltage of said power storage device when the temperature of said power storage unit is to be raised preferentially.

7. The power supply system according to claim 1, wherein said control device controls said converter such that the voltage on said power line attains a target voltage, sets said target voltage to a first voltage value higher than said lower limit value when said sensed voltage reaches said lower limit value during said temperature rise control, and sets said target voltage to a second voltage value lower than said upper limit value when said sensed voltage reaches said upper limit value during said temperature rise control.

8. The power supply system according to claim 7, wherein said first voltage value is said upper limit value, and said second voltage value is said lower limit value.

9. The power supply system according to claim 1, wherein said control device controls said converter such that a charge/discharge current of said power storage device attains a target current, sets said target current to a first current value such that said power storage device discharges when said sensed voltage reaches said lower limit value during said temperature rise control, and sets said target current to a second current value such that said power storage device is charged when said sensed voltage reaches said upper limit value during said temperature rise control.

10. The power supply system according to claim 9, wherein said second current value is equal to a value obtained by inverting a sign of said first current value.

11. The power supply system according to claim 1, wherein said power storage device includes a secondary battery, and said power storage unit includes a capacitor.

12. The power supply system according to claim 1, wherein said power storage unit is a smoothing capacitor reducing an electric power variation component of said power line.

13. A vehicle comprising:
    the power supply system according to claim 1; and
    a drive power generating unit generating a drive power of the vehicle by receiving the electric power supplied from said power supply system.

14. A temperature rise control method of a power storage device in a power supply system capable of supplying an electric power to a load device,
    said power supply system including:
    the chargeable and dischargeable power storage device,
    a power line configured to be capable of transmitting the electric power between the power supply system and said load device,
    a converter arranged between said power storage device and said power line for performing voltage conversion between said power storage device and said power line,
    a chargeable and dischargeable power storage unit connected to said power line, and
    a voltage sensor sensing a voltage on said power line,
    said temperature rise control method comprising:
    a first step of controlling said converter by setting a predetermined target value;
    a second step of determining whether the voltage sensed by said voltage sensor reached a lower limit value or not;

a third step of setting said target value such that said converter passes the electric power from said power storage device through said power line to said power storage unit, when it is determined that said sensed voltage reached said lower limit value;

a fourth step of determining whether said sensed voltage reached an upper limit value or not; and a fifth step of setting said target value such that said converter passes the electric power from said power storage unit through said power line to said power storage device, when it is determined that said sensed voltage reached said upper limit value.

15. A computer-readable. recording medium bearing a program for causing a computer to execute temperature rise control of a power storage device in a power supply system capable of supplying an electric power to a load device, said power supply system including:

the chargeable and dischargeable power storage device, a power line configured to be capable of transmitting the electric power between the power supply system and said load device, a converter arranged between said power storage device and said power line for performing voltage conversion between said power storage device and said power line, a chargeable and dischargeable power storage unit connected to said power line, and a voltage sensor sensing a voltage on said power line, said recording medium bearing the program for causing the computer to execute:

a first step of controlling said converter by setting a predetermined target value;

a second step of determining whether the voltage sensed by said voltage sensor reached a lower limit value or not;

a third step of setting said target value such that said converter passes the electric power from said power storage device through said power line to said power storage unit, when it is determined that said sensed voltage reached said lower limit value;

a fourth step of determining whether said sensed voltage reached an upper limit value or not; and a fifth step of setting said target value such that said converter passes the electric power from said power storage unit through said power line to said power storage device, when it is determined that said sensed voltage reached said upper limit value.

* * * * *